US012746819B2

(12) United States Patent
Amano

(10) Patent No.: US 12,746,819 B2
(45) Date of Patent: Sep. 29, 2026

(54) AERIAL IMAGE INPUT DISPLAY DEVICE WITH THREE-DIMENSIONAL TOUCH OPERATION UNIT

(71) Applicant: Alps Alpine Co., Ltd., Tokyo (JP)

(72) Inventor: Takashi Amano, Iwaki (JP)

(73) Assignee: ALPS ALPINE CO., LTD., Tokyo (JP)

( * ) Notice: Subject to any disclaimer, the term of this patent is extended or adjusted under 35 U.S.C. 154(b) by 148 days.

(21) Appl. No.: 18/426,739

(22) Filed: Jan. 30, 2024

(65) Prior Publication Data

US 2024/0262196 A1 Aug. 8, 2024

(30) Foreign Application Priority Data

Feb. 7, 2023 (JP) ................................ 2023-016632

(51) Int. Cl.

| | |
|---|---|
| ***B60K 35/10*** | (2024.01) |
| ***B60K 35/21*** | (2024.01) |
| ***G06F 3/0362*** | (2013.01) |
| ***G06F 3/041*** | (2006.01) |
| ***G06F 3/044*** | (2006.01) |

(52) U.S. Cl.

CPC ............ *B60K 35/10* (2024.01); *B60K 35/212* (2024.01); *G06F 3/0362* (2013.01); *G06F 3/0412* (2013.01); *G06F 3/044* (2013.01); *B60K 2360/1434* (2024.01); *B60K 2360/23* (2024.01)

(58) Field of Classification Search

CPC ............. H03K 17/955; H03K 17/9622; H03K 2217/96062; H03K 2217/96031; H03K 2217/96079; G06F 3/044; G06F 3/0362; G06F 3/0412; G06F 2203/04101; B60K 35/212; B60K 35/10; B60K 2360/1434; B60K 2360/23; G02B 30/40; G02B 30/56

See application file for complete search history.

(56) References Cited

U.S. PATENT DOCUMENTS

| | | | | |
|---|---|---|---|---|
| 2019/0303001 | A1 | 10/2019 | Kikuchi | |
| 2019/0356907 | A1* | 11/2019 | Iguchi | G02B 30/27 |
| 2020/0326051 | A1 | 10/2020 | Fong | |
| 2022/0413645 | A1* | 12/2022 | Edo | G02B 30/30 |
| 2024/0184133 | A1* | 6/2024 | Takahashi | G02B 30/56 |

FOREIGN PATENT DOCUMENTS

| | | | |
|---|---|---|---|
| DE | 10 2020 112777 | A1 | 11/2021 |
| JP | 2020-190832 | A | 11/2020 |
| WO | WO 2009/121380 | A1 | 10/2009 |
| WO | WO 2021/228588 | A1 | 11/2021 |

OTHER PUBLICATIONS

European Search Report from EP 24154752.0, Jun. 18, 2024, 8 pgs.

* cited by examiner

*Primary Examiner* — Yaron Cohen

(74) *Attorney, Agent, or Firm* — Crowell & Moring LLP

(57) ABSTRACT

An input display device includes an image display device having a function of displaying an image in the air, and a capacitive touch panel disposed on the image display device. A knob is provided as at least one transparent three-dimensional operation unit on a surface of the touch panel, and an aerial image is displayed at a position not beyond a top surface that is a touch surface of the knob.

8 Claims, 5 Drawing Sheets

AERIAL IMAGE INPUT DISPLAY DEVICE WITH THREE-DIMENSIONAL TOUCH OPERATION UNIT

RELATED APPLICATION

The present application claims priority to Japanese Patent Application No. 2023-016632, filed Feb. 7, 2023, the entirety of which is herein incorporated by reference.

BACKGROUND

1. Field

The present disclosure relates to an input display device having a human-machine interface function, and more particularly, to an input display device including a three-dimensional operation unit.

2. Description of the Related Art

An input display device is disclosed in which a convex portion is provided on a touch panel placed over a display, and an image such as an operation icon is displayed at a position overlapping the convex portion (e.g., JP 2020-190832 A). A user performs an input by performing a touch operation on the convex portion.

SUMMARY

Concerning a display device that performs an operation with a capacitive touch panel, there has been proposed a user interface (hereinafter, referred to as a three-dimensional UI) capable of tactilely recognizing a touch position without having to gaze or look at the touch position by providing a cover glass having an uneven shape.

FIG. 1A is an example in which a conventional flat touch panel is operated. In the example of FIG. 1A, a user U visually recognizes an operation icon 12 displayed on a display 10 and performs an input by performing a touch operation on the position of the operation icon 12 (a musical note in the example of FIG. 1A).

FIG. 1B is an example in which a touch panel having a three-dimensional UI is operated, and FIG. 1C is a schematic cross-sectional view of the three-dimensional UI. A transparent cover lens 26 having an uneven shape is attached onto a touch panel 24, and a display 20 displays an operation icon 22 at a position overlapping the cover lens 26. A user U performs an input by touching the cover lens 26 with a finger. A highly sensitive electrostatic sensor capable of sensing a capacitance (distance) of a finger even when the finger is disposed at a distance from the sensor is used for touch detection, making it possible to determine whether there is a touch on the cover lens 26, even if it is thick. As a result, it is possible to reduce touch mistakes (operation mistakes) under a situation where it is difficult to gaze or look at the in-vehicle display during driving.

When a thick uneven portion (e.g., an operation unit such as a knob or a button) is used in the three-dimensional UI, the display 20 displays the operation icon 22 below a cylindrical transparent knob 30, as illustrated in FIG. 2. However, if there is a distance between a position at which the operation icon 22 is displayed and a top surface 32 that is a touch surface of the knob 30, a finger U may fail to reach the operation icon 22 due to a physical gap between the top surface 32 and a place (the operation icon 22) that the user wants to touch, and a sensory deviation may occur, leading to an erroneous operation. In addition, a foreign substance feeling occurs because the uneven portion is stuck on the touch panel or the uneven portion protrudes from the touch panel, leading to deteriorations in quality and design.

On the other hand, in JP 2020-190832 A, the uneven portion is filled with a light guide member, and an icon or the like is displayed on a top surface portion thereof. However, the light guide member makes it difficult to express the transparency of the part such as a knob, leading to a deterioration in design.

In view of the above, there is a demand for an expression method in which an icon is displayed in the top surface portion of the knob, and the uneven portion is also recognized as a part of the image display device.

The present disclosure has been made to solve such a conventional problem, and an object of the present disclosure is to provide an input display device capable of displaying an image inside a three-dimensional operation unit.

An input display device according to the present disclosure includes: an image display device having a function of displaying an image in the air, and a capacitive touch panel disposed on the image display device, wherein the touch panel includes at least one transparent three-dimensional operation unit on a surface thereof, and the image is displayed inside the operation unit.

In an aspect, the operation unit includes a top surface that is a touch surface, and the image is formed at a position not beyond the top surface. In an aspect, the input display device further includes a detector configured to detect a touch operation, including proximity to the touch panel. In an aspect, the operation unit is molded integrally with a cover glass of the touch panel. In an aspect, the operation unit is coupled to a cover glass of the touch panel via an optical adhesive. In an aspect, the image display device displays the image in the air using a retroreflective member. In an aspect, the operation unit is a cylindrical or rectangular knob or button.

According to the present disclosure, by displaying an image inside the three-dimensional operation unit, it is possible to reduce a discrepancy between a tactile sense and a visual sense when the user touches the operation unit. In addition, it is possible to recognize the three-dimensional operation unit as a part of the image display device, thereby suppressing a foreign substance feeling toward the touch panel and improving design.

DETAILED DESCRIPTION

Next, embodiments of the present disclosure will be described. An input display device according to the present disclosure provides an interface between a person and a machine. The input display device according to the present disclosure is not particularly limited, but is applied to, for example, an electronic device equipped with a touch panel display. The electronic device equipped with the touch panel display is, for example, an in-vehicle device having a navigation function, an audio visual function, a television function, and/or the like.

As the input display device according to the present disclosure, a display device (aerial display) using an aerial image forming technology is adopted to show an image as if the image exists in a hollow or interior of an uneven portion (a three-dimensional UI unit) of a touch panel. At this time, the image formation position is set to be located in the uneven portion. As a result, the uneven portion is recognized as a part of the image display device, thereby improving quality and design.

Figure 1A:
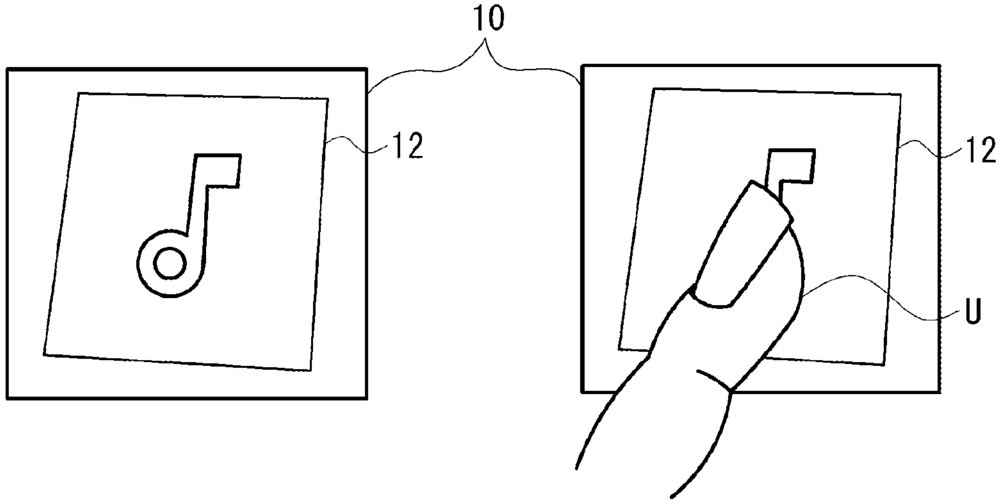
FIG. 1A illustrates an example in which a flat touch panel is operated.
Figure 1B:
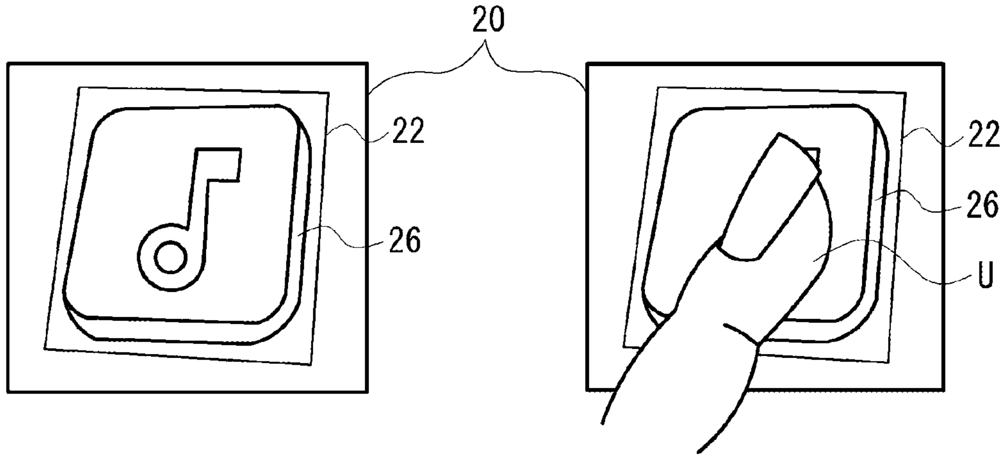
FIG. 1B illustrates an example in which a touch panel of a three-dimensional UI is operated.
Figure 1C:
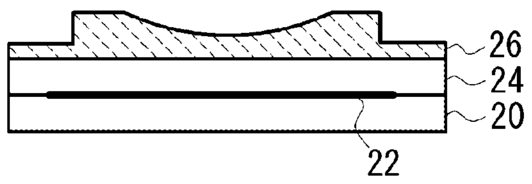
FIG. 1C is a schematic cross-sectional view of the three-dimensional UI.
Figure 2A:
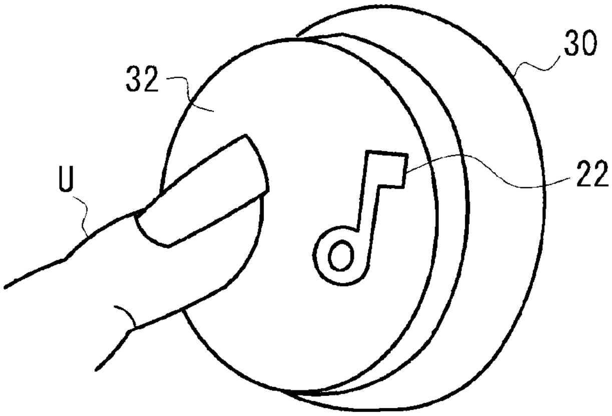
FIGS. 2A-B are diagrams for explaining a problem of a three-dimensional operation unit (knob) of a conventional input display device.
Figure 2B:
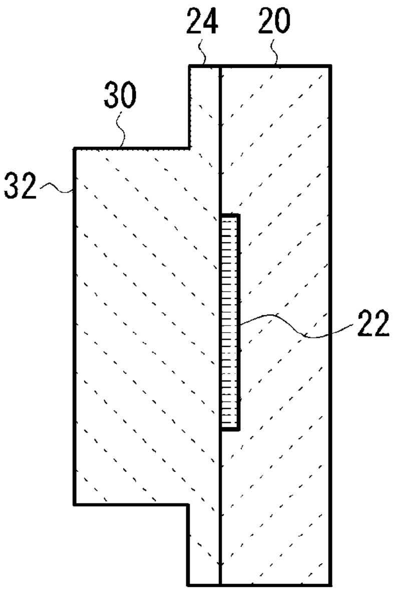
Figure 3:
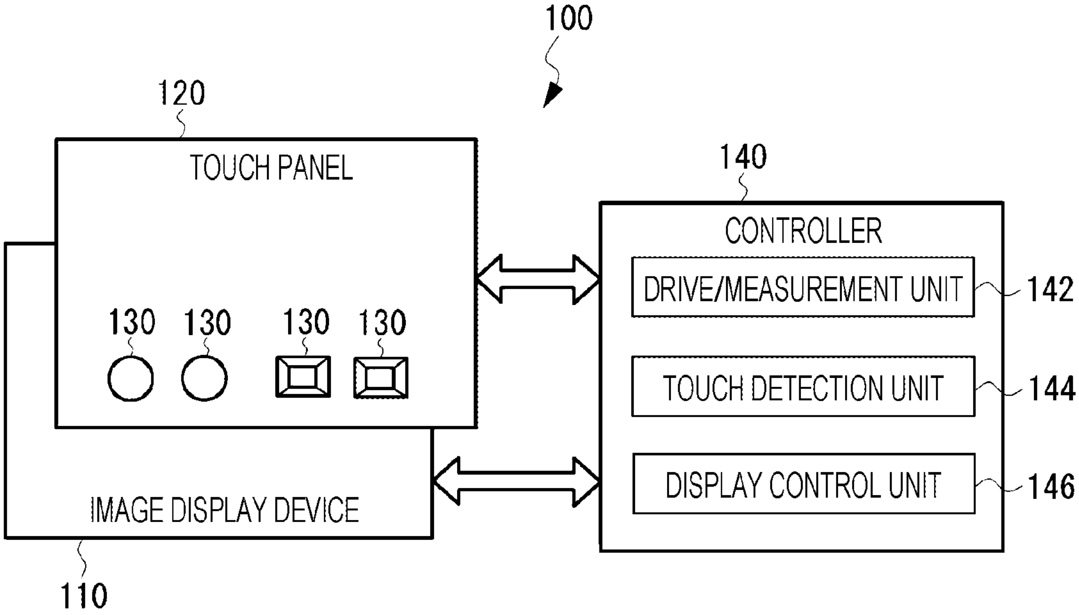
FIG. 3 is a block diagram illustrating a configuration of an input display device according to an embodiment of the present disclosure.

Next, embodiments of the present disclosure will be described in detail with reference to the drawings. FIG. 3 is a block diagram illustrating a configuration of an input display device according to an embodiment of the present disclosure. An input display device 100 according to the present embodiment includes an image display device 110 having a function of displaying an image in the air, a capacitive touch panel 120 mounted on the image display device 110, one or more transparent three-dimensional UI units (or operation units) 130 having three-dimensional shapes and attached to a surface of the touch panel 120, and a controller 140 controlling image display of the image display device 110, touch detection of the touch panel 120, and/or the like.

Figure 4A:
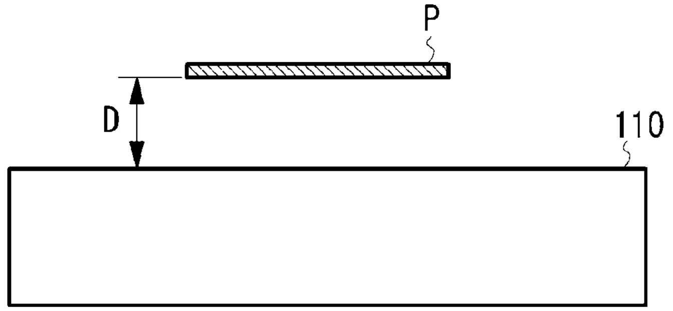
FIGS. 4A-C are diagrams illustrating an example of a configuration for displaying an aerial image in an image display device according to an embodiment of the present disclosure.

The image display device 110 has at least a function of displaying an image in the air as one of the functions, and for example, has a function of displaying an aerial image P at a position of a height D from a surface of a display, as illustrated in FIG. 4A. The image display device 110 can also have a function of displaying an image on a screen such as a flat liquid crystal display in addition to the function of displaying an aerial image.

A technique for displaying an image in the air is not particularly limited, but for example, a technique using a retroreflective member is known. The applicant of the present application discloses such a technique in, for example, JP 2022-180814 A, JP 2022-179868 A, JP 2022-177400 A, JP 2022-150245 A, and JP 2022-150214 A, all of which are herein incorporated by reference.

Figure 4B:
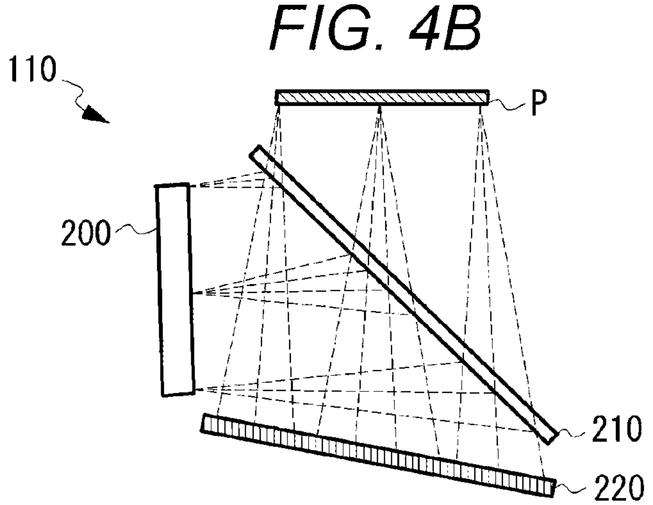

FIG. 4B is a schematic cross-sectional view illustrating an example of a configuration for displaying an image in the air. The image display device 110 includes a light source 200, a beam splitter 210, and a retroreflective member 220, and attached positions and angles of these members are appropriately adjusted in a housing or a casing to form an aerial image P at the position of the height D.

The light source 200 includes, for example, a liquid crystal display, an organic EL display, or the like, and outputs an image to a two-dimensional display area. The image generated by the light source 200 is an original image of the aerial image P, and the image is, for example, an operation icon or the like.

The beam splitter 210 is an optical member that splits incident light into reflected light and transmitted light, and includes, for example, a half mirror. The beam splitter 210 is disposed to be inclined with respect to a light emission direction of the light source 200, and the beam splitter 210 transmits some of light from the light source 200, and reflects the remaining light toward the retroreflective member 220.

The retroreflective member 220 is an optical member that emits light in a direction toward the side from which the light is incident, and includes a prismatic retroreflective element, such as a triangular pyramid retroreflective element or a full cube corner retroreflective element, or a bead retroreflective element. The retroreflective member 220 reflects light incident from the beam splitter 210 in a direction toward the side from which the light is incident, and causes the reflected light to move back to the beam splitter 210. The light transmitted through the beam splitter 210 is diffused after convergence to form an aerial image P. The aerial image P is formed at a position symmetrical to the light source 200 with respect to the surface of the beam splitter 210.

Figure 4C:
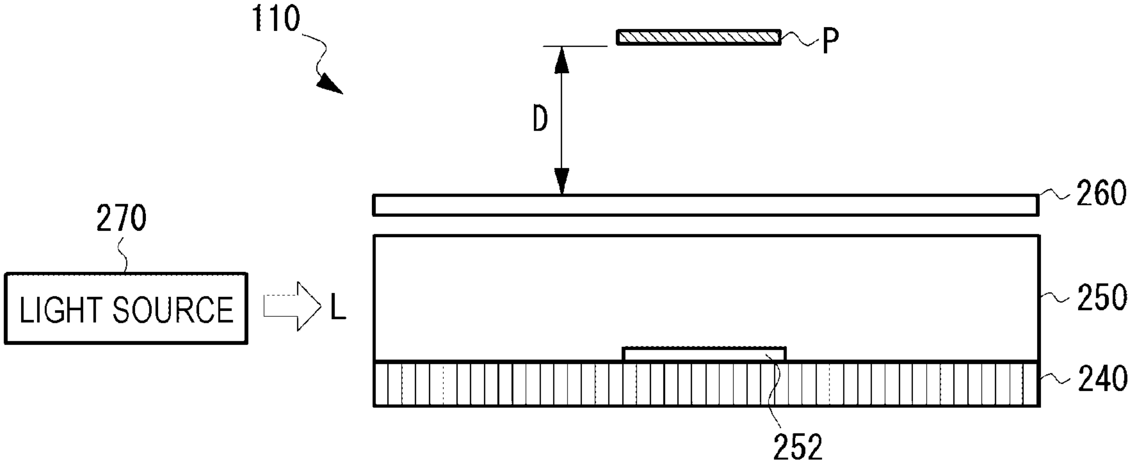

FIG. 4C is a schematic cross-sectional view illustrating another example of a configuration for displaying an image in the air. The image display device 110 includes a retroreflective member 240, a light guide plate 250 disposed above the retroreflective member 240, a half mirror 260 disposed above the light guide plate 250, and a light source 270, such as an LED.

Light L emitted from the light source 270 is incident from a side portion of the light guide plate 250, and uniformly irradiates the inside of the light guide plate 250. A light diffusion unit 252 for diffusing the incident light L in a vertical direction is formed at the bottom of the light guide plate 250. The light diffusion unit 252 configures an original image for generating an aerial image P.

Some of the light diffused or scattered in the vertical direction by the light diffusion unit 252 of the light guide plate 250 is transmitted through the half mirror 260, and the remaining light is reflected by the half mirror 260. The reflected light is incident on the retroreflective member 240. The light incident on the retroreflective member 240 is reflected in a direction toward the side from which the light is incident, and the light is transmitted through the half mirror 260 to form an aerial image P. The aerial image P is formed at a position symmetrical to the light diffusion unit 252 with respect to the surface of the half mirror 260.

The touch panel 120 includes, for example, a plurality of detection units (sensors) formed at positions where a plurality of X-side and Y-side electrode lines intersect. The detection unit detects a capacitance when a finger, a hand, or the like of a user approaches or contacts the touch panel 120. The touch panel 120 is mounted on the image display device 110 to provide an input interface for the user to make an input to an icon or the like displayed on the image display device 110.

The touch panel 120 further includes one or more three-dimensional operation units 130 (hereinafter, three-dimensional UI units) on the transparent panel. The three-dimensional UI unit 130 is constituted by a transparent member having an uneven shape, and the shape, size, height, and the like thereof are not particularly limited. However, the three-dimensional UI unit 130 is configured in such a manner that, when the user's hand or finger approaches or contacts a top surface or a touch surface of the three-dimensional UI unit 130, the capacitance at that position changes. The top surface of the three-dimensional UI unit 130 is not necessarily required to be flat, and may be uneven or inclined. Furthermore, the three-dimensional UI unit 130 may be entirely made of a transparent material, or may be partially hollow inside.

Figure 5A:
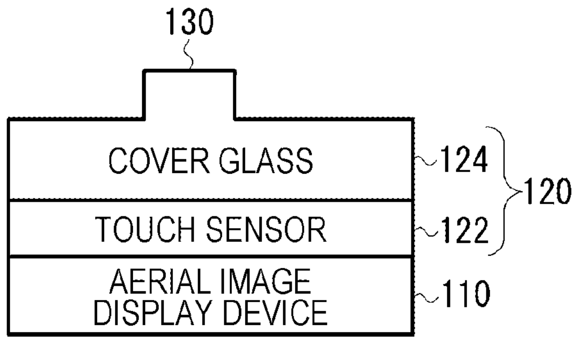
FIGS. 5A-B are cross-sectional views schematically illustrating an example of a configuration of a three-dimensional knob according to an embodiment of the present disclosure.
Figure 5B:
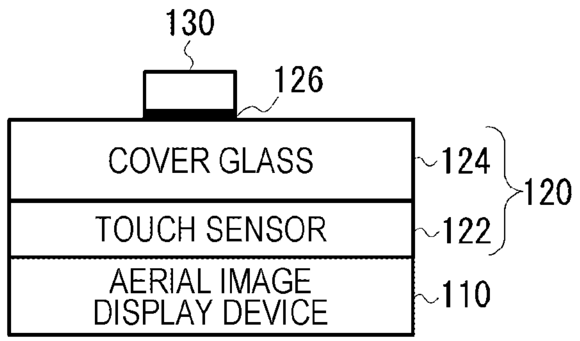

FIG. 3 illustrates an example in which four three-dimensional UI units 130 having a cylindrical shape and a rectangular shape are attached to a lower portion of the touch panel 120. The three-dimensional UI unit 130 has, for example, a three-dimensional shape such as a button or a knob, and the three-dimensional UI unit 130 is constituted by, for example, a clear part such as glass or plastic. For example, the three-dimensional UI unit 130 is integrally molded with a cover glass 124 on the touch sensor 122, as illustrated in FIG. 5A, or is pasted on a flat cover glass 124 with an optical adhesive (OCA/OCR or the like) 126, as illustrated in FIG. 5B.

Information on coordinates of a position at which the three-dimensional UI unit 130 is attached, height of the three-dimensional UI unit 130, and the like is registered in advance in a memory of the controller 140. For example, if the three-dimensional UI unit 130 has a cylindrical shape, coordinates of the center of the bottom surface of the three-dimensional UI unit 130 are registered as the attachment position, or if the three-dimensional UI unit 130 has a rectangular parallelepiped shape, coordinates of a position at which the diagonal lines of the rectangular bottom surface of the three-dimensional UI unit 130 intersect each other are registered as the attachment position.

Next, the controller 140 will be described in detail. The controller 140 is electrically connected to the image display device 110 and the touch panel 120 to perform display control of the image display device 110 and touch control of the touch panel 120. The controller 140 is executed by hardware and/or software, and is configured using, for example, an arithmetic processing unit, a microcontroller including a ROM/RAM, a CPU, a GPU, and/or the like.

As illustrated in FIG. 3, the controller 140 includes a drive/measurement unit 142, a touch detection unit 144, and a display control unit 146. The drive/measurement unit 142 drives a plurality of electrode lines on the X side and/or the Y side of the touch panel 120, and measures a capacitance of a detection unit (sensor) of each of the driven electrode lines. The measurement cycle is, for example, 60 frames/second.

The touch detection unit 144 detects a touch position on the touch panel 120 based on the capacitance measured by the drive/measurement unit 142. Here, the touch position includes not only a position when the user's finger contacts the touch panel 120 but also a position when the user's finger approaches the touch panel 120 at a certain distance. For example, when the user's finger contacts or approaches the flat surface of the touch panel 120, the touch detection unit 144 detects coordinates of a touch position based on a change in capacitance of a corresponding detection unit. Similarly, when the user's finger contacts or approaches the three-dimensional UI unit 130, a capacitance of a detection unit corresponding to the three-dimensional UI unit 130 changes, and the touch detection unit 144 detects a touch on the three-dimensional UI unit 130 according to the change in capacitance. When the touch position is detected by the touch detection unit 144, the controller 140 determines that there is a user input and executes processing such as image control according to the input.

The display control unit 146 controls image display of the image display device 110. For example, the display control unit 146 displays an icon representing a user's input operation as an aerial image at a position overlapping the three-dimensional UI unit 130. Furthermore, the display control unit 146 can also display an icon for user operation on a flat display screen other than the three-dimensional UI unit 130. The user visually recognizes the operation icon and performs an input by touching the three-dimensional UI unit 130 or the flat touch panel. When the user's touch operation is input, the display control unit 146 switches image display and the like.

Figure 6A:
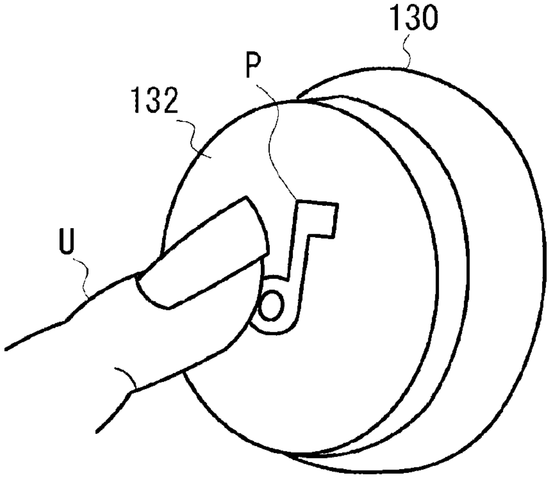
FIGS. 6A-B are diagrams illustrating an example in which an aerial image is displayed by the input display device according to an embodiment of the present disclosure.
Figure 6B:
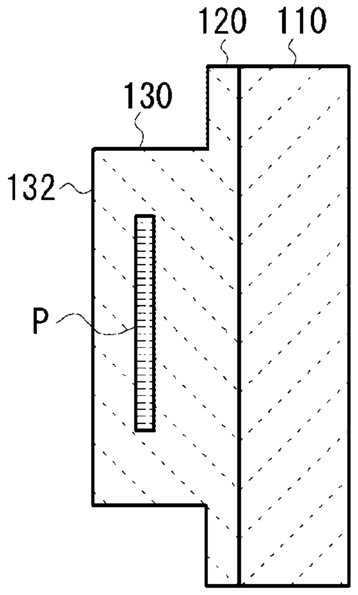

FIG. 6 is an example in which the input display device 100 according to the present embodiment displays an aerial image. An aerial image P (an operation icon that is a musical note in the example of FIG. 6) displayed by the image display device 110 is displayed inside a cylindrical knob 130, that is, in a range not beyond a top surface 132. Preferably, the aerial image P is displayed in the vicinity of the top surface 132. As a result, a distance between the top surface 132, which is a touch surface, and the position at which the aerial image P is displayed is small, and it is possible to suppress a sensory deviation or discrepancy when the user touches the knob 130. In addition, since the aerial image P is displayed in the vicinity of the top surface 132 of the knob 130, the knob 130 is easily recognized as a part of the image display device, and the design is improved.

Figure 7A:
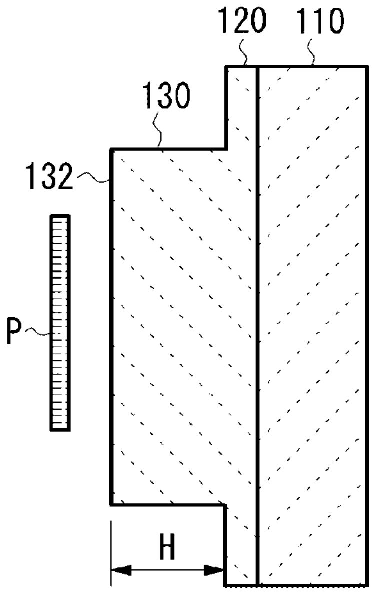
FIGS. 7A-C are diagrams illustrating an example in which a position at which an aerial image is formed is adjusted according to an embodiment of the present disclosure.

Here, as illustrated in FIG. 7A, if the position at which the aerial image P is formed by the image display device 110 is beyond the height H of the top surface 132 (or the thickness) of the knob 130, a sense of unity between the knob 130 and the image display device 110 cannot be sufficiently obtained.

Figure 7B:
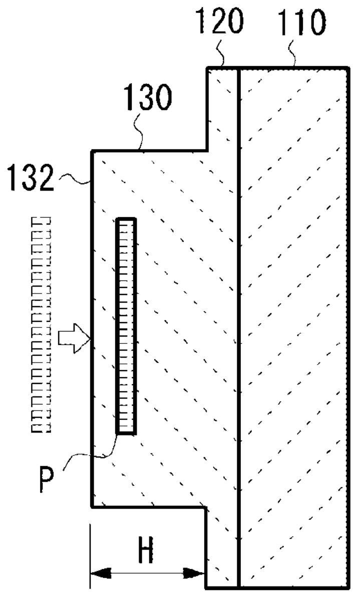

Therefore, as illustrated in FIG. 7B, the position at which the aerial image P is formed is set in such a manner that the aerial image P is not beyond the height H of the knob 130, that is, the aerial image P is displayed in the vicinity of the top surface 132 of the knob 130. The image formation position is set by adjusting positions and angles at which optical members such as a retroreflective member and a beam splitter (half mirror) of the image display device 110 are attached. Note that an adjustment mechanism for adjusting positions and angles of these optical members can be provided in the image display device 110, and the adjustment mechanism may be driven manually or by a power source, such as a motor.

Figure 7C:
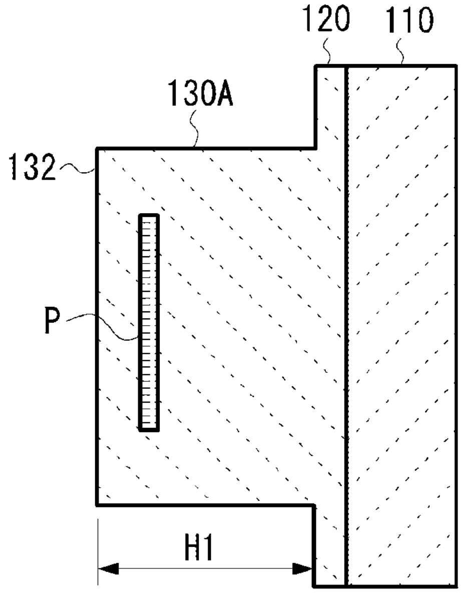

Furthermore, in another aspect, as illustrated in FIG. 7C, a knob 130A having a large height H1 may be attached so that the position at which the aerial image P is formed is not beyond the top surface 132 of the knob 130 (H1>H).

As described above, according to the present embodiment, the input display device including the three-dimensional UI is capable of reducing the foreign substance feeling of the uneven portion and improving the visibility, the quality, and the design.

Although the preferred embodiments of the present disclosure have been described in detail above, the present disclosure is not limited to the specific embodiments, and various modifications and alterations can be made within the scope of the gist of the invention set forth in the claims.

What is claimed is:

1. An input display device comprising:

an image display device configured to display an aerial image at a height from a surface of a display of the image display device; and a capacitive touch panel disposed on the image display device, wherein the touch panel includes at least one transparent three-dimensional operation unit as an uneven portion of the touch panel on a surface thereof, the transparent three-dimensional operation unit forming a top surface that is a touch surface, and the image is displayed inside the transparent three-dimensional operation unit at a position overlapping the top surface, and wherein the transparent three-dimensional operation unit is a physical, solid, three-dimensional structure physically mounted on or integrally formed with the touch panel, such that the top surface of the three-dimensional operation unit is a tangible touch surface contactable by a user's finger.

2. The input display device according to claim 1, wherein the position is not beyond the top surface.

3. The input display device according to claim 1, further comprising a detector configured to detect a touch operation including proximity to the touch panel.

4. The input display device according to claim 1, wherein the transparent three-dimensional operation unit is molded integrally with a cover glass of the touch panel.

5. The input display device according to claim 1, wherein the transparent three-dimensional operation unit is coupled to a cover glass of the touch panel via an optical adhesive.

6. The input display device according to claim 1, wherein the image display device displays the image in the air using a retroreflective member.

7. The input display device according to claim 1, wherein the transparent three-dimensional operation unit is a cylindrical or rectangular knob or button.

8. The input display device according to claim 7, wherein a perimeter of the transparent three-dimensional operation unit is graspable by fingers on a hand of the user.

* * * * *